US011584309B2

(12) United States Patent
Russell et al.

(10) Patent No.: US 11,584,309 B2
(45) Date of Patent: *Feb. 21, 2023

(54) MIRROR POD ENVIRONMENTAL SENSOR ARRANGEMENT FOR AUTONOMOUS VEHICLE ENABLING LANE CHANGE DECISIONS

(71) Applicant: Locomation, Inc., Sewickley, PA (US)

(72) Inventors: Raymond Joseph Russell, Beaver, PA (US); Brad Allen Dranko, Pittsburgh, PA (US); Owen J. Bawden, New Farm (AU); Tekin Mericli, Pittsburgh, PA (US)

(73) Assignee: Locomation, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,587

(22) Filed: Sep. 16, 2021

(65) Prior Publication Data

US 2022/0097624 A1 Mar. 31, 2022

Related U.S. Application Data

(63) Continuation of application No. 16/899,669, filed on Jun. 12, 2020, now Pat. No. 11,124,132.

(60) Provisional application No. 62/861,502, filed on Jun. 14, 2019.

(51) Int. Cl.
*B60R 11/04* (2006.01)
*B60R 1/12* (2006.01)

(52) U.S. Cl.
CPC ............... *B60R 11/04* (2013.01); *B60R 1/12* (2013.01); *B60R 2001/1223* (2013.01); *B60R 2001/1253* (2013.01)

(58) Field of Classification Search
CPC ... B60R 11/04; B60R 1/12; B60R 2001/1223; B60R 2001/1253; B60W 2422/00; B60W 2552/53; B60W 2554/801; B60W 2554/802; B60W 30/12; B60W 30/165
See application file for complete search history.

(56) References Cited

U.S. PATENT DOCUMENTS 11,124,132 B2 * 9/2021 Russell ................. B60R 11/04
2019/0204845 A1 * 7/2019 Grossman ............. G01S 13/865

FOREIGN PATENT DOCUMENTS

WO  WO-2017196165 A1 * 11/2017 ............... B60R 1/00

* cited by examiner

*Primary Examiner* — Sath V Perungavoor
*Assistant Examiner* — Tyler B Edwards
(74) *Attorney, Agent, or Firm* — David J. Thibodeau, Jr.; VLP Law Group. LLP

(57) ABSTRACT

An approach to arrange sensors needed for automated driving, especially where semitrailer trucks are operating in an autonomous convoy with one automated or semi-automated truck following another. The sensors are fitted to a location adjacent to or within the exterior rearview mirrors, on each of the left- and right-hand side of the tractor. The sensors provide overlapping fields of view looking forward of the vehicle and to both the left and right hand sides at the same time.

22 Claims, 10 Drawing Sheets

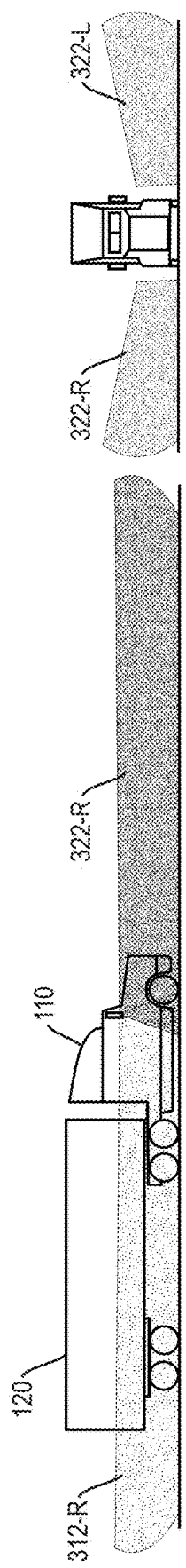
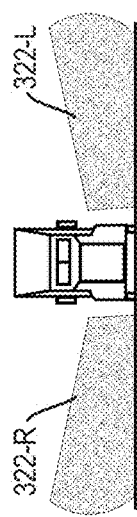
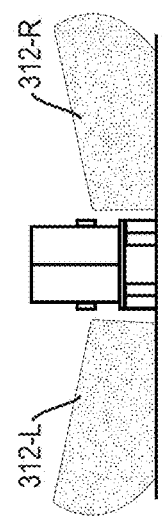
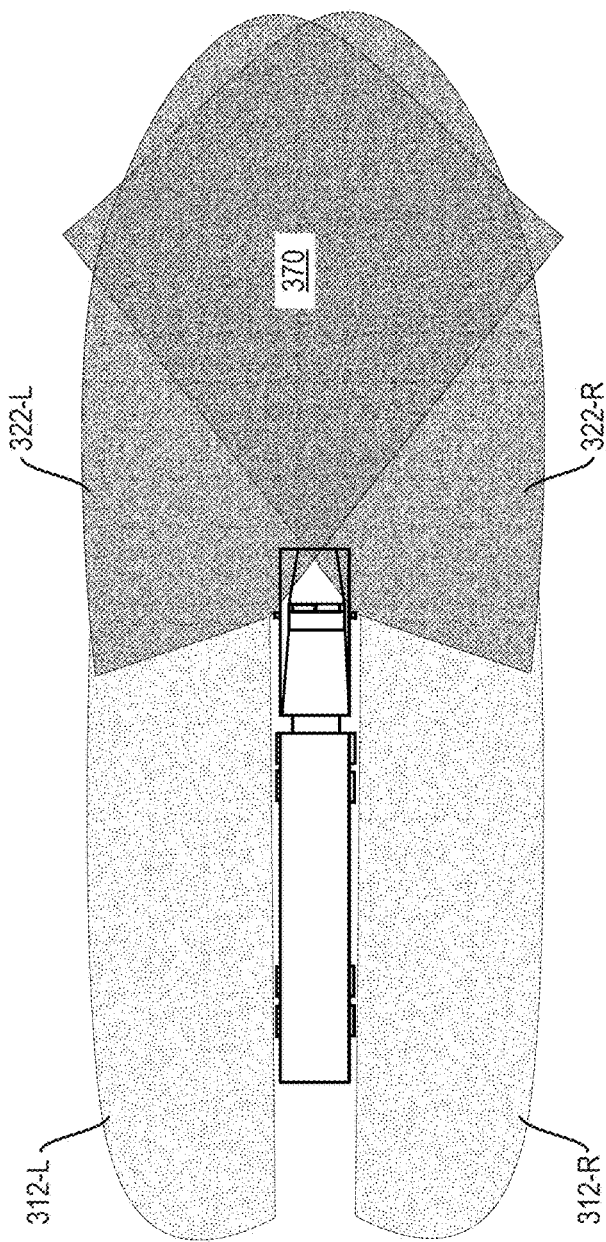

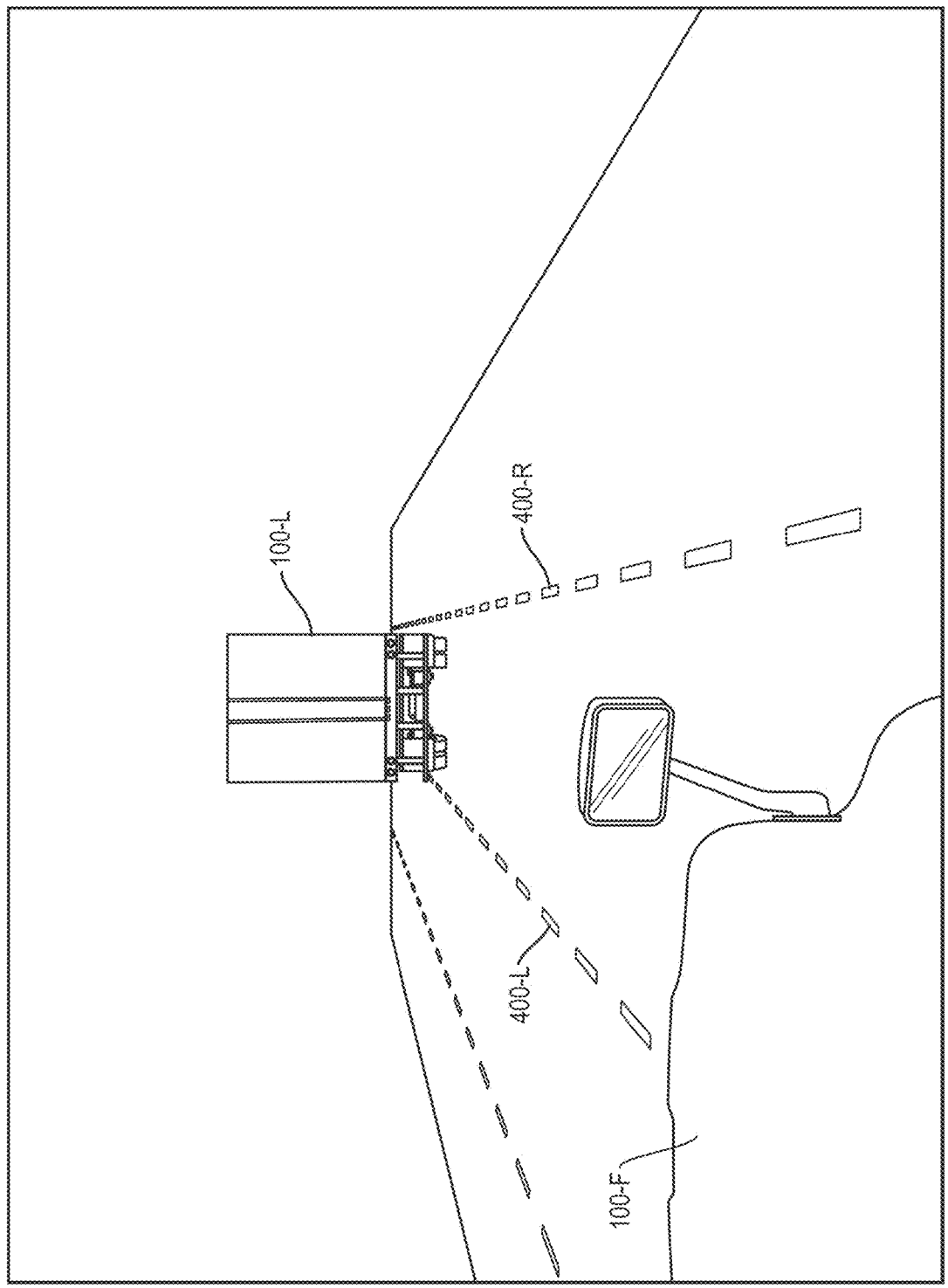

MIRROR POD ENVIRONMENTAL SENSOR ARRANGEMENT FOR AUTONOMOUS VEHICLE ENABLING LANE CHANGE DECISIONS

CROSS REFERENCE TO RELATED APPLICATIONS

This application is a continuation of a co-pending U.S. patent application Ser. No. 16/899,669 filed Jun. 12, 2020 entitled "MIRROR POD ENVIRONMENTAL SENSOR ARRANGEMENT FOR AUTONOMOUS VEHICLE" which claims priority to a U.S. Provisional Patent Application Ser. No. 62/861,502 filed Jun. 14, 2019 entitled "MIRROR POD ENVIRONMENTAL SENSOR ARRANGEMENT FOR AUTONOMOUS VEHICLE" the entire contents of which are hereby incorporated by reference.

BACKGROUND

Proper operation of autonomous vehicles is heavily reliant on cameras and other sensors to detect the presence of nearby objects and other operating conditions. One common approach for cars is to mount cameras and other sensors as close as possible to the vehicle's plane of symmetry. However, sensor placement in other types of vehicles, such as semitrailer trucks, have different considerations.

International patent application WO2017196165A1 (DAF Trucks NV) entitled "Platooning method for application in heavy trucks" shows side view mirrors that include lane marking detectors and forward looking cameras. As a result, a reference point P at the back of the trailer of the leading vehicle, can be used to reduce the headway distance attainable with a single, center-mounted camera. It is also said that, since the lane detector is mounted outside the vehicle width, at least one of the devices is always able to measure the relative position, relative heading and curve radius of the current lane.

U.S. Patent Publication US2018/0372875A1 (Uber Technologies) shows a sensor assembly that includes replacement side mirrors.

European Patent Publication EP3138736B1 (MAN Truck and Bus AG) also shows a mirror replacement system that includes cameras.

SUMMARY

In the case of automated semitrailer trucks, using a high mounted center position on the truck is not ideal, since the long, extended hood of the cab can block the forward view of items such as lane markings and other objects. Also, when platooning two trucks, the closer a follower vehicle is to the leader, the closer the camera on the follower is to the trailer of the leader, and thus the less the camera on the follower can see of its surroundings.

The approach described here places a suite of sensors (e.g., lidar detectors and forward- and rear-facing cameras) in a location adjacent to or within the exterior rear view mirror housings on both sides of the cab. The lidar positioning arrangement minimizes interference and enhances sensor coverage. For example, these mounting positions enable a pair of lidars to cover both the peripheral and blind spots areas on the sides of the truck, and to also cover the area in front occupied by a lead vehicle at the same time. In addition, forward-facing cameras can capture images of the rear of the lead vehicle, as well as the road down either side of the vehicle, important for tasks such as lane following and obstacle avoidance. The rear-facing cameras can be angled to cover a field of view down the side of the truck and trailer and a large area to either side.

The sensors can be placed in a separate enclosure mounted to an existing metal casting of standard rearview truck mirrors. Other implementations can include custom integrated assemblies specific to each truck model. Cabling for the sensors are routed internally through or along the mirror mounting arm into the truck door cavity, which may be via a flexible door hinge to interface with the main autonomy electronics.

In one particular arrangement, a pair of assemblies is provided within or on both sides of a vehicle such as an autonomous or semi-autonomous truck. Each assembly includes two or more perception sensors which are positioned and oriented relative to each other so as to have a substantially non-overlapping field of view (FOV). The perception sensors in each assembly typically include a forward facing sensor and a rearward facing sensor that have at least one region of overlapping field of view alongside the truck. The perception sensors are further disposed such that both (i) the lane markings adjacent to the truck, and (ii) lane markings adjacent at least one truck forward or behind it are also within a field of view of at least one perception sensor. As a result, vehicles forward, behind and to the side of the autonomous truck are always within a field of view of at least one perception sensor.

BRIEF DESCRIPTION OF THE DRAWINGS

FIGS. 3A to 3D illustrate preferred arrangements for the sensors' field of view.

FIG. 6A is an example view from the forward-facing camera of a follower vehicle.

DETAILED DESCRIPTION OF PREFERRED EMBODIMENTS

Figure 1:
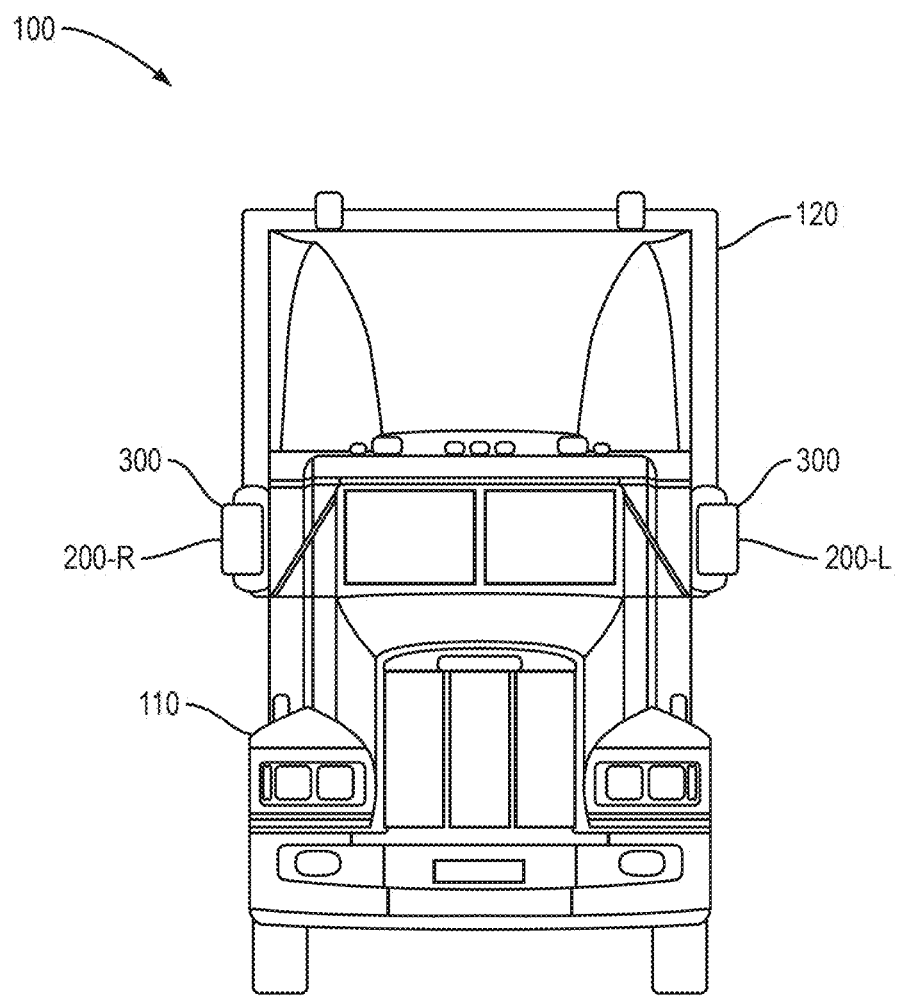
FIG. 1 shows an example semitrailer truck having a suite of sensors as described herein.

FIG. 1 shows the front of a typical vehicle such as semitrailer truck 100. A tractor 110 (typically having a cab portion in which a driver sits) is towing a trailer 120. Of particular interest is a way to package and manage the sensors 300 needed for automated or semi-automated driving, especially where two (or more) trucks 100 are travelling in a group or platoon, with one automated or semi-automated truck following another as companions. Here, the sensors 300 are fitted to a location adjacent to or within each of two exterior rearview mirrors 200-L, 200-R, located on a respective left- and right-hand side of the cab 110. As described in more detail below, the sensors 300 are arranged to provide overlapping fields of view looking forward of the truck 100 and to both the left and right hand sides of the truck 100 at the same time.

Figure 2A:
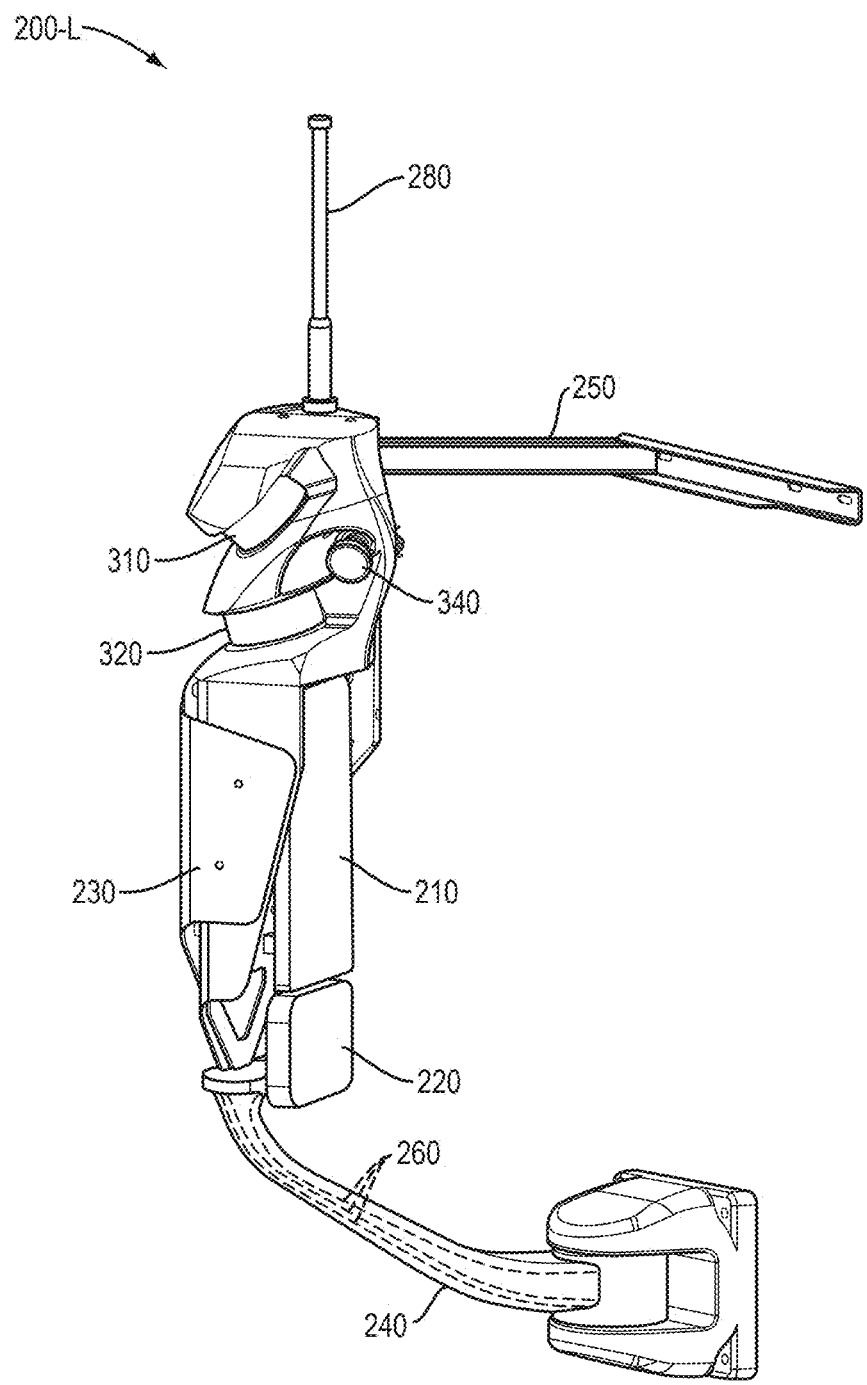
FIGS. 2A and 2B show the sensors in a typical location within or adjacent a rear view mirror.
Figure 2B:
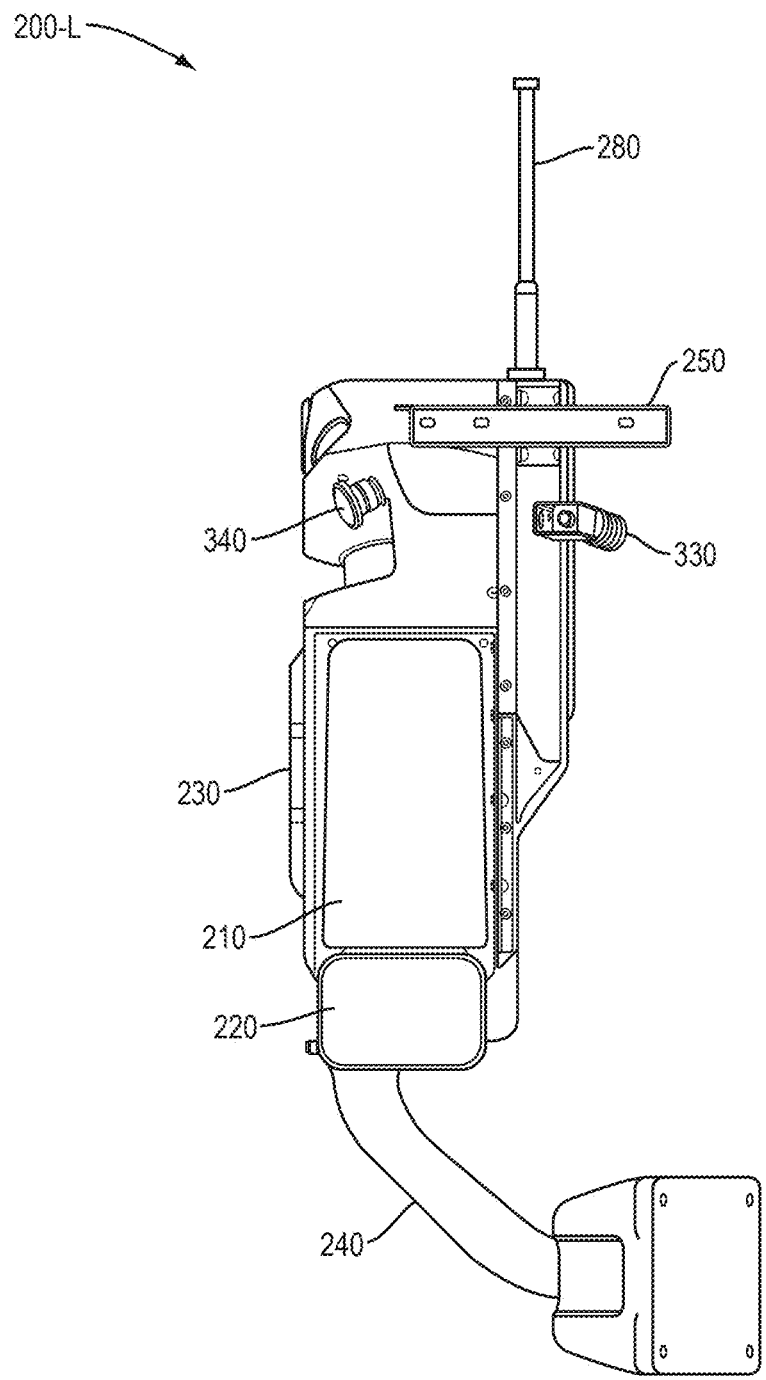

FIGS. 2A and 2B show one way in which these sensors 300 may be packaged, potentially integrated with other components. Here the familiar rear view, flat glass mirror 210 (sometimes referred to as a "West Coast" mirror in the United States), is seen with another glass convex mirror 220 disposed below it. Above these optical mirrors 210, 220 are mounted sensors 300, such as a pair of lidar sensors 310, 320 and a pair of digital video cameras 330, 340. It should be understood that in other arrangements, other lidars or cameras, radars, sonars can be included, or indeed, any perception sensor 300 that detects a physical property of a nearby object or some other condition related to the area adjacent the truck 100.

The upper most sensor 310 is a blind spot lidar, which may for example, be mounted with a 16-degree pitch and 45-degree roll orientation (pitch being referenced to a center lateral axis of the vehicle 100 and roll with reference to a center longitudinal axis of the vehicle 100). The blind spot lidar is primarily responsible for looking primarily backwards from the mirror position. A second, peripheral lidar, functions to detect objects forward of the mirror and to the sides, and it is mounted, for example, with a pitch of 9 degrees and roll of 13 degrees.

Each lidar 310, 320 is operated to scan in essentially an omnidirectional radiation pattern, so they can see both forward and backward.

Also shown are a primarily front-facing digital video camera 330 and a primarily side and rear-facing digital video camera 340.

The lidars and cameras can be enclosed in a mirror housing 230 that also includes the two mirrors 210, 220 (as shown), but may also be packaged in a housing separate from such a mirror housing. Housing 230 may also enclose or support other electrical or electronic components such as antennas 280. In either arrangement, the lidars 310, 320 and cameras 330, 340 (that is, as with their associated housing) are physically supported by a lower 240 and/or upper 250 mounting arm extending from the cab. As FIG. 2 indicates, signal and power wires 260 for the sensors 300 are preferably routed inside of the mounting arm 240. In one embodiment, the wiring can then run from the mounting arm 240 into the cab 110 where the control electronics and control computers that execute autonomous or semi-autonomous control of the truck(s) are located.

In some embodiments the sensors 300 may not be mounted in or within the mirrors themselves. What is important is that they are located on or outboard of the left and right sidewalls of the cab, positioned outside of the envelope of the truck 100. Being outside of the envelope is what enables them to provide improved detection.

The location for the sensors 300 should be chosen such that other vehicles, objects and/or navigational landmarks that are forward, behind and to the side of the truck 100 are within a field of view of at least one sensor. Vehicles may include other trucks, passenger cars, Sports Utility Vehicles (SUVs), motorcycles, and the like. Objects encountered along a road may include moving things such as people or animals, and navigational landmarks may include features of the surrounding terrain, mountain peaks, utility poles, pavement edges, walls, fences, bridges, tunnels or anything else that is fixed in position and recognizable or detectable, Moving on to FIGS. 3A to 3D, the sensors 300 are located and operated in a particular way so that overlapping fields of view are provided on both the left and right hand sides of the truck, as well as another overlapping field of view in a direction forward of the truck. The fields of view may be two-dimensional, scanning in a single plane, or three-dimensional. FIG. 3A is an example where there are two, three-dimensional (3D) lidar fields of view (FOVs) on the vehicle's right side, showing how the fields of view of the two lidars 310, 320 overlap approximately at the middle and forward of the cab 110 such as in a region 370. More particularly, the right-side lidar 310-R may provide rearward-looking field of view 312-R, and right-side lidar 320-R may provide forward-looking field of view 322-R. In some embodiments, the exact amount of overlap 370 (as shown in FIG. 3B) is not particularly critical, and what is important is to ensure there is no gap between 312-R and 322-R, the primary reason for the overlap being to make sure that any objects adjacent the sides of the truck will not be in a sensor "blind spot". In other embodiments, the overlapping fields of view function primarily to eliminate occluded regions, known as range shadows, or to provide more pixels on the area(s) of interest. It should also be understood that the exact arrangement of sensors 300, their location on or within the mirrors, their respective fields of view will depend upon the exterior design features of truck 100 and especially the tractor 110.

The sensors may be packaged and sold as a mirror housing 230 assembly that can be retrofit to an existing truck 100. Such mirror housing assemblies may have suites of sensors that are arranged in positions and with orientations that are optimized for specific models of tractors 110. For example, one model of retrofit mirror housing 230 may be designed for a Peterbuilt truck, and another may be particular to a Volvo truck.

Turning attention to the top view of FIG. 3B, it is also the case that the two forward facing sensors on the left and right side also have respective scan patterns that overlap. One important use for these sensor outputs 300, in a semi-automated driving application, is to permit a following vehicle to accurately detect the position of the rear of the leading vehicle. This will be further explained below. The greater the forward facing field of view overlap, the closer that the vehicle in front can be and still be seen in both views.

Having overlap(s) 370 in the forward direction is meaningful for providing the best performance in an autonomous truck application. The view looking forward should provide a clear and accurate picture of the rear of the vehicle in front. If that front vehicle is quite far away, the following vehicle's ability to "follow the leader" depends on an accurate measurement of that longitudinal spacing, and any lateral offset of the front truck. And particularly for the lidars, to have two lidars that are each measuring the forward truck allows a more accurate measurement of where the forward truck is. This improved result occurs because with two sensors on the following truck, there are twice as many usable data points detected (e.g., with two lidars, there are twice as many lidar measurements per second) that are reflected from the rear door of the lead truck. For cameras, the large lateral distance separating the left from the right-side mirrors leads to much improved resolution in computing the longitudinal distance (or rate of change of distance) to the front vehicle trailer based on the parallax caused by their different points of view.

For many decades, mirrors have been placed in a privileged position on the exterior of a cab portion of the tractor 110, to enable the driver to see as much as possible around the vehicle. The left side mirror is placed as close as possible to the driver's seat, as the driver sits in an elevated position above the hood of the engine. One advantage to the approach described here is that the lidars 310, 320 (and/or other sensors 330, 340) are now also placed in a similar location enabling them to see everything from only two vantage points on the side of the vehicle.

In other mobile robot applications, the "prime real estate" is often considered to be at the very top of a robot. However for a passenger vehicle such as a car or a truck, or a military personnel carrier, that location is often very contested—other devices such as GPS antennas or radio antennas or weapons also want to be there. Also, an omnidirectional lidar is also often placed on the roof of autonomous cars. In contrast to such roof-centered placement, placing lidars and other sensors elsewhere on a car, such as one on each of the four corners of the car body, is generally thought to increase cost and reduce visibility due to the lowered position of the corners relative to the roof.

In the case of a semitrailer truck, however, the roof of the cab portion of the tractor 110 is usually lower than the roof of the trailer 120. Thus, if the sensors are placed on the roof of the tractor 110, the trailer 120 is going to occlude the field of view, at least towards the rear, and the tractor 110 itself may occlude the view downward.

Another consideration is that often the same company does not own the tractor 110 as owns the trailer 120, and it is important to be able to swap trailers 120 rapidly. Therefore, it is relatively impractical to introduce any sort of specialized equipment to the trailer 120, on a dedicated basis or otherwise. Mounting any of the sensors 300 on the trailer 120 would also require some communication back and forth to the tractor 110, and those signals have to be connected, somehow, to the computers in the tractor 110. So it is simpler, if the sensors 300 can be placed on the tractor 110 itself to the extent possible (and even exclusively), as opposed to on the trailer 120.

Also important to consider, particularly for lidar, is that a semitrailer truck 100 is a segmented vehicle. Unlike a car, the tractor 110 and the trailer 120 will yaw relative to each other when the vehicle 100 follows curves in the road. If there is a mixture of sensors, some on the tractor 110, and some on the trailer 120, that yaw angle often needs to be measured accurately to compensate for such position differences.

Therefore, there are many reasons why using two positions, on the top of each of the left and right side mirrors, is advantageous.

FIGS. 3C and 3D, front looking 322 and rear looking 312 lidar fields of view, show that they extend slightly upwards and downwards. This is preferable because it cannot be assumed, for example, that even if the terrain is locally flat, the tractor 110 and trailer 120 will be always perfectly level with respect to one another. The road may have an incline, or slightly varying camber, or follow terrain that has a steep drop off to one side or the other of the trucks). It can also be useful to sense tall objects to the side like bridges, utility poles, and tunnel walls in order to, for example, control lateral position or to determine the location of the truck 100 in a global map in a manner that mimics the capacity of the global positioning system (GPS) to do so.

It is also important for the forward 322 and rearward 312 fields of view to include the locations of lane markings next to the truck(s) 100. For example, a forward-looking camera 320 alone may not provide enough information to detect where a follower truck 100 is with respect to a travel lane, since that view may be occluded by the hood of the tractor 110, or occluded by the trailer 120 of a leader truck 100, especially when the two trucks are preferably following closely. Detection of lane markings can compensate for delays in video data acquisition and processing. Thus, sensor outputs 300 that also provide a downward-looking view of lane markings can enable improved estimates of where the wheels are relative to the travel lane.

Figure 4:
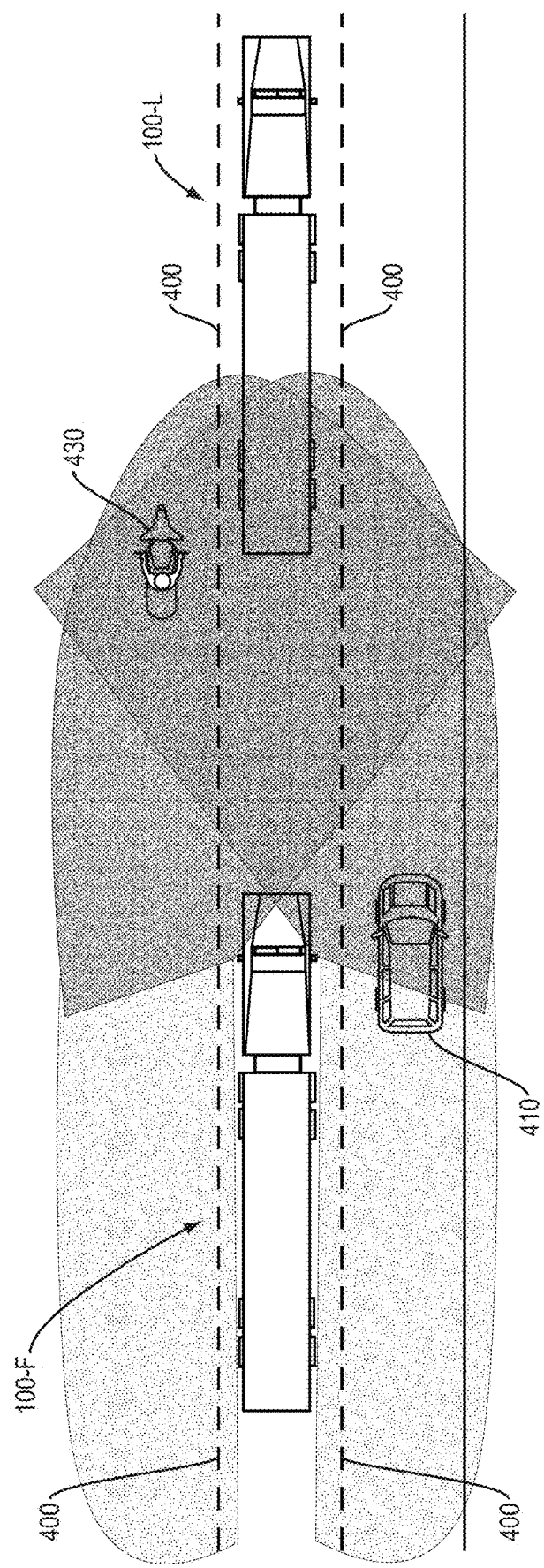
FIG. 4 shows how a pair of sensors detect lane markings on either side of the truck including any object in a blind spot.

FIG. 4 illustrates how a leader truck 100-L and a follower truck 100-F and how the field of view of the set of sensors 300 can be utilized to detect lane markings 400 on either side of the trucks 100-L, 100-F, as well as any other vehicle that might be in a blind spot (such as the SUV 410 in a lane to the right of the follower truck 100-F). Both forward looking sensors 320-L, 320-R on the follower 100-F also see the rear of the leader truck 100-F ahead, as well as a motorcycle 430 that's in the lane to its left (which may be in a blind spot for the leader truck 100-L).

It should be understood that FIGS. 3A-3D and 4 are representative of the fields of view 312-L, 312-R, 322-L, 322-R, and are not necessarily to scale. The field of view finally realized will vary depending on the different models of lidars or cameras used. Furthermore, the use of sensors 300 with narrower fields of view might motivate a skilled artisan to add more sensors to achieve the desired total field of view or degree of overlap. One example lidar sensor is a Velodyne VLP-16. Commercially available lidar sensors can actually see much further than what is shown here, such as 40, 50, or even 100 meters out, and digital video cameras 330, 340 can resolve small objects equally far away. It is therefore understood that the exact fields of view to accomplish the advantages described herein therefore depend on the different model(s) of lidars chosen, their exact positions on or within the mirror housings, and other factors such as environmental conditions. What is important is that the sensors are arranged and positioned to minimize occlusion by the respective exterior body components of the autonomous truck (including for example the hood of the tractor) while also maximizing the area around the autonomous truck for which obstacles are detected.

FIG. 4 is also presented in the context of a convoy where two trucks are travelling together such that the follower 100-F is an instrumented follower 100-F and the leader 100-L has a human driver or other master controller. The master controller may be responsible for, or share responsibility, to coordinate control of the leader and follower, such as to execute a lane change operation in which both the leader 100-L and follower 100-F change lanes together as companions. But the same arrangements of sensors 300 is just as valuable for an instrumented leader situation (where the follower 100-F is controlling how the leader 100-L behaves). So, it can be valuable for each of the follower 100-F and leader 100-L vehicles to communicate their respective sensor information to the other companion truck in the convoy. The information can be passed between vehicles using wireless data subsystems such as vehicle-to-vehicle (V2V), cellular, or other digital radios. The information is then displayed to the human driver or control computer to consider when making decisions. In one scenario, where there is a human driver in the lead truck 100-L, and the follower 100-F is autonomous, the driver of the lead vehicle 100-L must consider that it is effectively three times longer when making lane change decisions. But now the autonomous control systems on the follower 100-F can now have the capacity to veto a desire of the lead vehicle to change lanes, or to send information to the leader 100-L about what's in sensor or mirror blind spots of either truck (more generally, to assist by providing data that's less visible to that lead 100-L truck driver, based on the sensors that are on the follower 100-F).

Returning attention to FIG. 4, consider a situation where the lead truck 100-L may not be able to detect the presence of the SUV to the right of the follower 100-F. By having information from the sensors on the follower 100-F, the leader 100-L is now aware of that SUV and may decide to delay a lane change operation. The question, is of course, not simply whether the leader 100-L can change lanes, but rather whether both trucks can change lanes safely.

The sensor arrangement described herein thus permits a control mechanism on the decision-maker, whether it be the leader 100-L or the follower 100-F (and regardless of whether that control mechanism be fully automated or involve a human decision-maker), to consider obstacles to the left and right of both trucks 100-L, 100-F (including even small vehicles such as motorcycles) no matter where they are. Such decisions may now also consider lane markings on both sides of both vehicles 100-L, 100-F (and to distinguish whether the markings are solid or dotted, whether they are white or yellow, or transitioning from one type to another) as needed for situation awareness.

Continuing to reference FIG. 4 in the context of convoying, a leader truck 100-L in front is helping control the follower truck 100-F. However, that leader 100-L is also occluding what the sensors 300 on the follower 100-F can see. But another advantage of placing the sensors 300 out on each of the left and right mirror arms is that, at least with regard to occlusion of the lane markings 400, the leader 100-L cannot simultaneously occlude both the left line markings and the right lane markings (see also FIG. 6A). And so, by having forward-facing cameras 330-L, 330-R on both sides of the follower 100-F vehicle, it is now guaranteed that the follower 100-F will always be able to see at least either the left lane marking with the left camera 330-L or the left lidar, or the right lane marking with the right camera 330-R or the right lidar. Occlusion of the lane markings 400 by the leader 100-L, which is, in fact, guaranteed to happen during a lane change, is no longer a concern. Viewing the lane markings 400 as far ahead as those adjacent to the lead vehicle 100-L is also intrinsically valuable in terms of providing more accurate information on lane curvature.

FIG. 5 is an example of what the right-side, rear-facing camera 340-R might see. Here the camera 340-R sees a vehicle 510 in what would otherwise be a blind spot for a driver, as well as the lane markings. The rear wheels of the tractor 120 are almost directly down below the part of the tractor 110 where the sensors are mounted (e.g., within or on the mirrors. Thus, the output of this camera 340-R (and/or the downward section of the output of lidar 320-R) can be processed to provide a nearly direct measurement of the follower 100-F vehicle's lane center offset based on observing the location of the lane markings 400. It can be computed from the number of camera pixels that span the offset in the image from the present position of the lane edge multiplied by the distance spanned per pixel. The lane center offset can then be used to help the autonomous software keep the instrumented truck 100-L or 100-F in its lane. The lack of such a direct view of the lane markings adjacent the wheels forces prior art control system(s) to attempt to reconstruct a lane center offset error indication based on less relevant data.

Figure 5A:
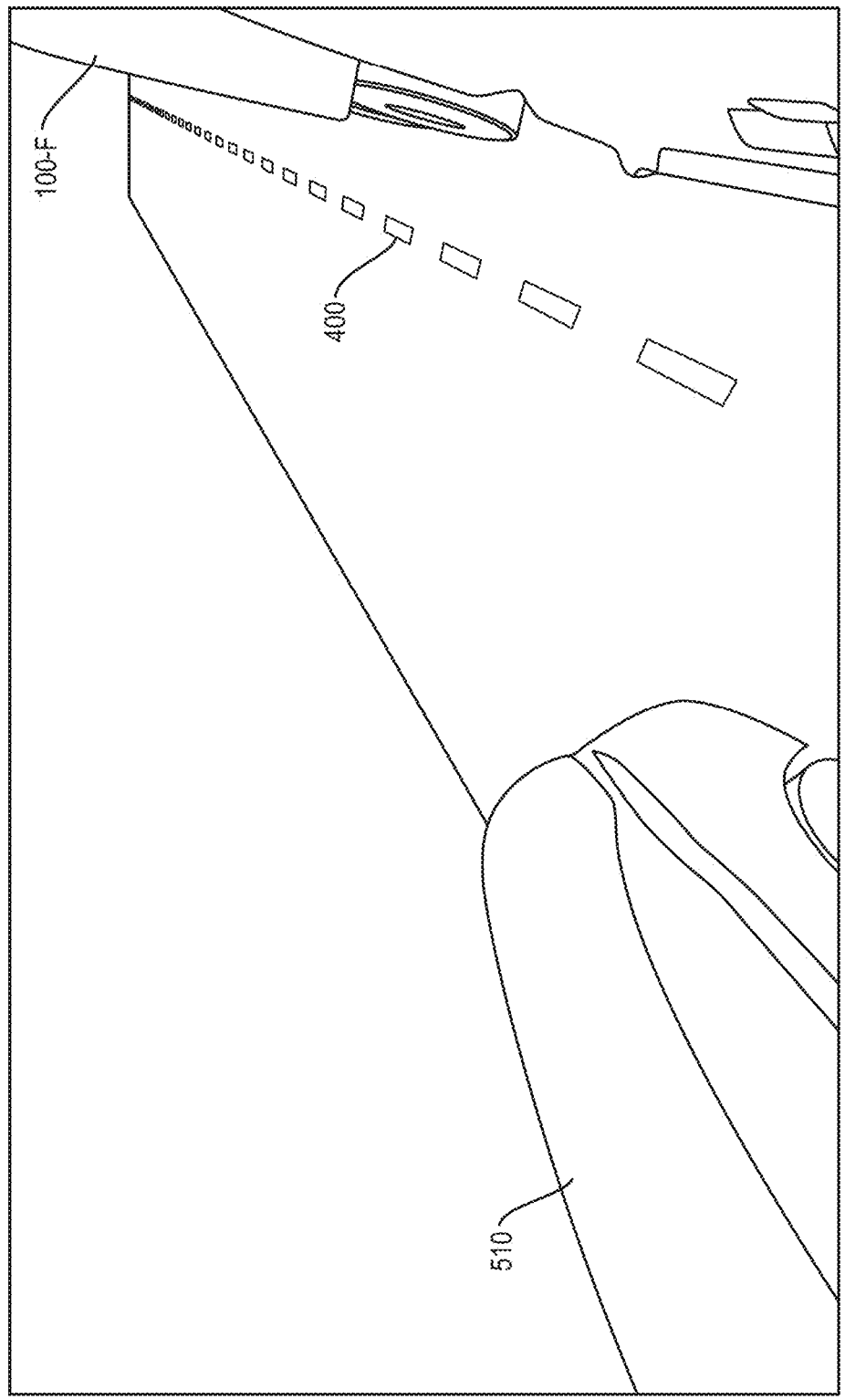
FIG. 5A is an example of what the right-side, rear-facing camera sees in a particular situation with a vehicle in the adjacent lane.
Figure 5B:
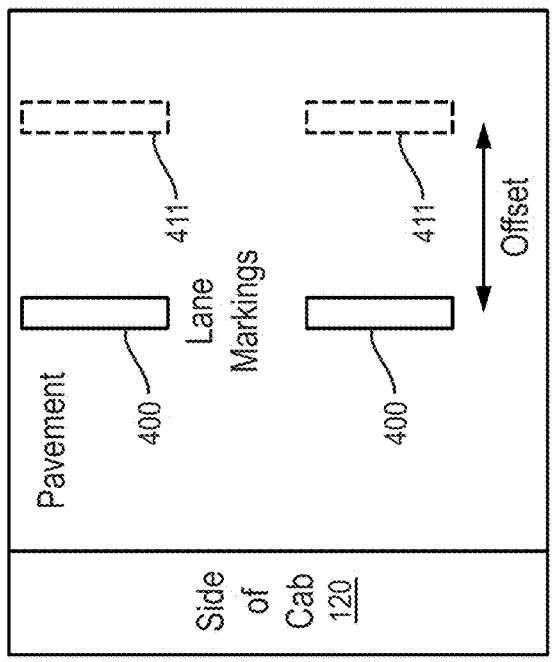
FIG. 5B shows detected center lane offset.
Figure 5C:
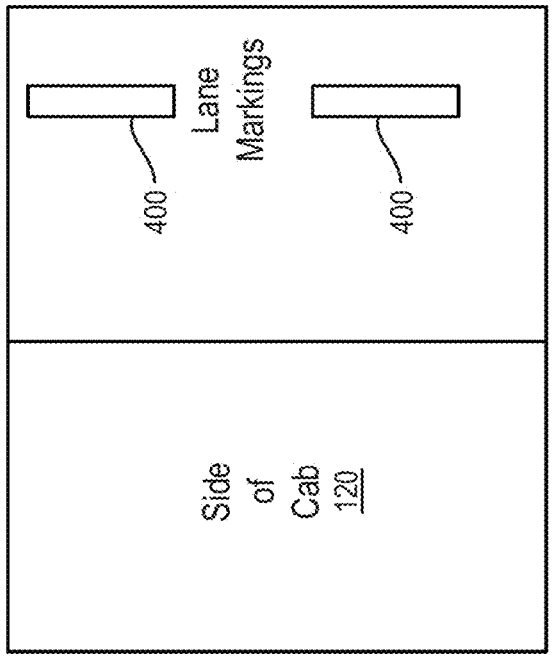
FIG. 5C shows an ideal center lane offset of zero.

FIG. 5B is an example depicting the output of the camera 340-R (and/or downward portion of the lidar 320-R's field of view showing a lane offset. FIG. 5C is an ideal expected image when the truck is perfectly aligned with the travel lane.

Figure 5D:
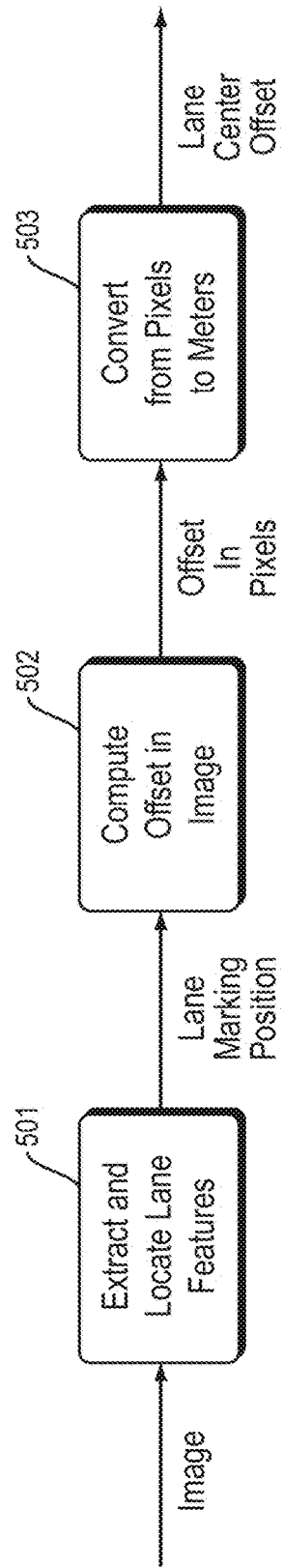
FIG. 5D is a flowchart describing visual measurement of such lane center offset of the follower vehicle.

FIG. 5D is a flowchart describing a process of using these visual measurements of lane center offset of the follower 100-F vehicle and a visual description of the ideal image data. The principle leverages the concept of visual servoing where, in general, the offset of important features (lane markings 400 in this case) from their ideal positions is used as an error signal that is presented as input to a controller. More particularly, the process may include steps as follows:

Step 501: Extract and Locate Lane Features: The image data (such as that in FIG. 5B) is processed to identify and then locate the lane markings 400, if any, in the image.

Step 502: Compute Offset in Image: The offset is computed as the difference between the present location of the lane markings 400 and their ideal location 411.

Step 503: Convert from Pixels to Meters: A model of how the camera 330 forms images is inverted to convert the offset from image coordinates to scene (real world) coordinates.

In other embodiments, the first two steps 501, 502 can instead be accomplished by computing the correlation (or other similarity measure) of the present (FIG. 5B) and ideal (FIG. 5C) images and finding the location of the peak in correlation.

FIG. 6A shows an example view from the forward-facing camera 330-R of the follower 100-F, where the lane center offset of the leader 100-L is so large that lane markings 400-L on the left are occluded by the leader 100-L, but the lane markings 400-R on the right are not.

Figure 6B:
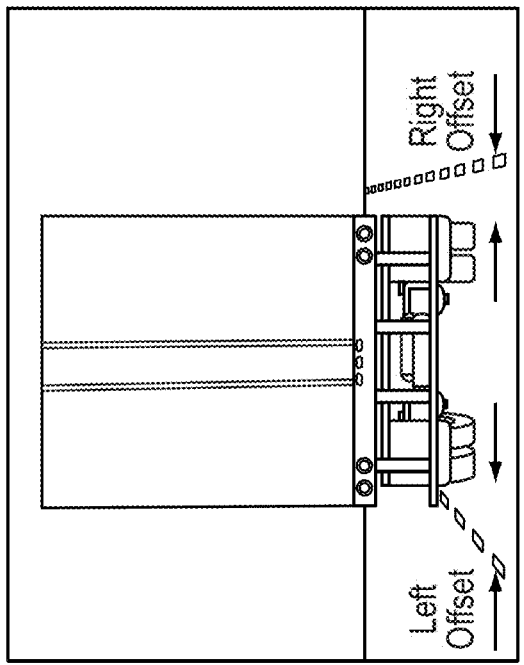
FIG. 6B depicts a leader center lane offset.

It can be important for the follower 100-F to mimic the lane center offset of the leader 100-L if, for example, the leader 100-L is avoiding an object that the sensors 300 on the follower 100-F cannot yet see. The sensor 300 configuration can also measure the lane center offset of the leader 100-L derived from either (or both) lane marking(s) 400-L, 400-R adjacent to the leader 100-L and visible ahead. FIG. 6B depicts such a situation, where either the left side offset, right side offset, or both the left and right side offset may be detected. Visual measurement of the leader 100-L's lane center offset in this manner may assist with decision making when the follower 100-F vehicle is intended to mimic the lane offset of the leader 100-L.

Figure 6C:
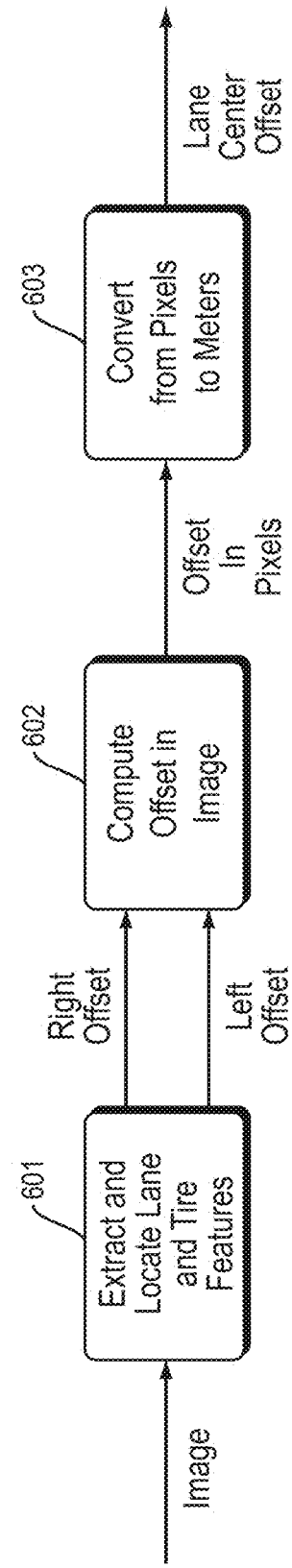
FIG. 6C is a flowchart depicting measurement of lane center offset of the leader.

FIG. 6C is a flowchart describing an example of such visual measurement of lane center offset of the leader 100-L vehicle and a visual description of the image data. Again, the offset of important features (lane markings 400 and tire edges in this case) from their ideal positions is used as an error signal that is presented as input to a controller. In one example the process is as follows (see FIG. 6D):

Step 601: Extract and Locate Lane and Tire Features: The image data is processed to identify and then locate the lane markings and tire edges, if any, in the image.

Step 602: Compute Offset in Image: The offset is computed, for example, as the average of the left and right offsets.

Step 603: Convert from Pixels to Meters: A model of how the camera forms images is inverted to convert the offset from image coordinates to scene (real world) coordinates.

Note that lane markings near the wheels are not generally occluded but half the offset of one marking can be used instead in that rare case.

In other embodiments, the first two steps can instead be accomplished by computing the correlation (or other similarity measure) of the present and an ideal image and finding the location of the peak in correlation.

Returning attention to FIG. 6A briefly, the same arrangement of sensors can be used to estimate a distance between the follower 100-F and leader 100-R. In some embodiments, it can be valuable to measure the rate of change of distance to a companion vehicle or even higher time derivatives of distance such as acceleration. As is well known in the art that such measurements can reduce reaction time in feedforward control and improve accuracy in predictive control.

Figure 7:
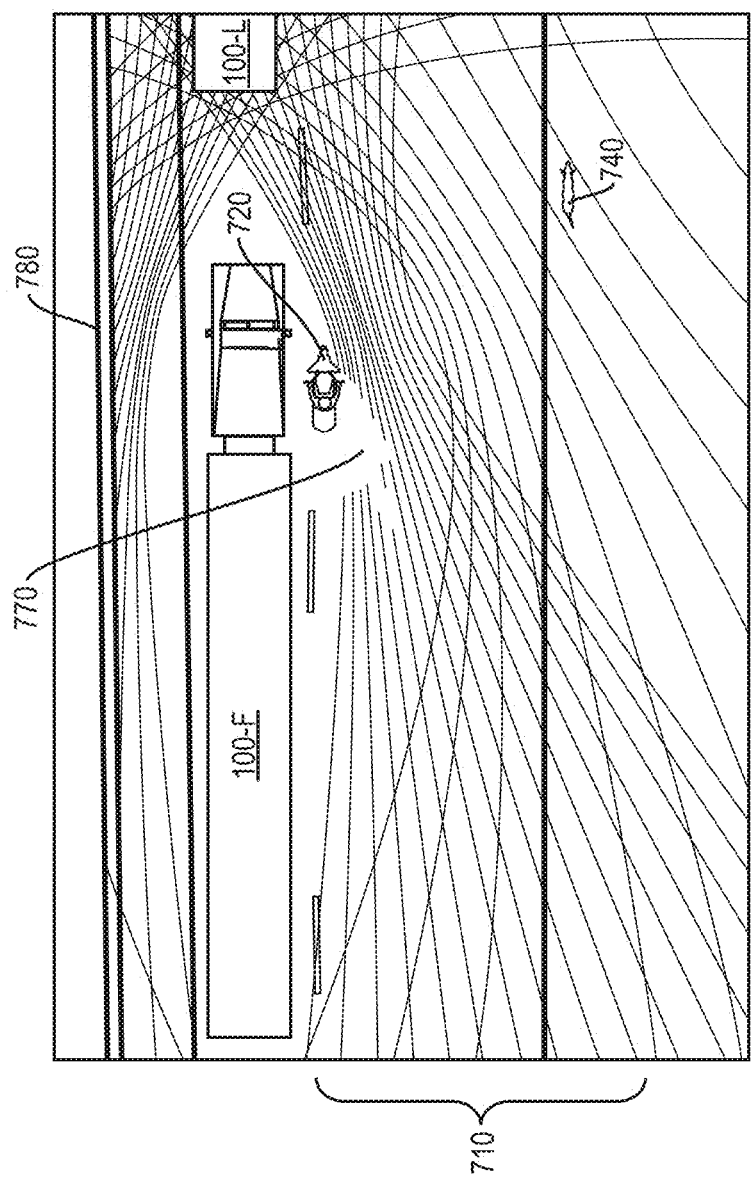
FIG. 7 shows a set of lidar data points detected on the right side of a follower.

FIG. 7 depicts a set of lidar data points 700 that might be detected on the right side of a follower 100-F truck. From the diagram, it can be seen that a motorcycle 720 which would normally be completely invisible to a driver using the mirrors alone (since the motorcycle is actually below the window of the cab in tractor 110) is actually quite visible to the lidar(s) 310, 320. This is indicated by the area 770 in the lidar output(s) that does not have data points, indicating that discrete lidar points have actually intercepted the motorcycle 720. Note too that the lidar also detects a small animal 740 on the side of the travel lanes as well.

So, if the lead truck 100-L veers to its right, and the follower 100-F truck and the motorcycle veer to their left, that motorcycle might, in fact, be occluded from the perspective of the lead driver by the trailer of the lead vehicle (the rear of which is depicted as the white rectangle on the right side of FIG. 7). As such, a human being driving the lead truck 100-L also cannot see that motorcycle 720 (or the animal 740), either, in this particular configuration of vehicles 100. And, if in fact there is no driver in the follower 100-F vehicle, there is no human being who has any sense that the motorcycle 720 is present. Thus the sensors 300 can be used to communicate to the driver (or other controller) of the lead vehicle 100-L that there is an object 720 or 740 that it cannot see making it unsafe to change lanes at the moment.

FIG. 7 also depicts how other functions are enabled by the suite of sensors 300 to sense other types of objects in or near the path of travel. For example, objects to the side like guard rails, bridges, utility poles, or tunnel walls 780 can now also be utilized to further control lateral position or to determine the location of the truck in a global map.

IMPLEMENTATION VARIATIONS

The foregoing description of example embodiments illustrates and describes systems and methods for implementing novel arrangement and operation of sensors in a vehicle. However, it is not intended to be exhaustive or limited to the precise form disclosed.

The embodiments described above may be implemented in many different ways. In some instances, the various "computers" and/or "controllers" are "data processors" or "embedded systems" that may be implemented by a one or more physical or virtual general purpose computers having a central processor, memory, disk or other mass storage, communication interface(s), input/output (I/O) device(s), and other peripherals. The general purpose computer is transformed into the processors with improved functionality, and executes the processes described above to provide improved operations. The processors may operate, for example, by loading software instructions, and then executing the instructions to carry out the functions described.

As is known in the art, such a computer may contain a system bus, where a bus is a set of hardware wired connections used for data transfer among the components of a computer or processing system. The bus or busses are shared conduit(s) that connect different elements of the computer system (e.g., processor, disk storage, memory, input/output ports, network ports, etc.) to enables the transfer of information. One or more central processor units are attached to the system bus and provide for the execution of computer instructions. Also attached to system bus are typically I/O device interfaces for connecting various input and output devices (e.g., sensors, lidars, cameras, keyboards, touch displays, speakers, wireless radios etc.) to the computer. Network interface(s) allow the computer to connect to various other devices or systems attached to a network. Memory provides volatile storage for computer software instructions and data used to implement an embodiment. Disk or other mass storage provides non-volatile storage for computer software instructions and data used to implement, for example, the various procedures described herein.

Certain portions may also be implemented as "logic" that performs one or more of the stated functions. This logic may include hardware, such as hardwired logic circuits, an application-specific integrated circuit, a field programmable gate array, a microprocessor, software, firmware, or a combination thereof. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Embodiments may therefore typically be implemented in hardware, firmware, software, or any combination thereof.

In some implementations, the computers or controllers that execute the processes described above may be deployed in whole or in part in a cloud computing arrangement that makes available one or more physical and/or virtual data processing machines via on-demand access to a network of shared configurable computing resources (e.g., networks, servers, storage, applications, and services) that can be rapidly provisioned and released with minimal management effort or service provider interaction.

Furthermore, firmware, software, routines, or instructions may be described herein as performing certain actions and/or functions. It also should be understood that the block and flow diagrams may include more or fewer elements, be arranged differently, or be represented differently. Therefore, it will be appreciated that such descriptions contained herein are merely for convenience and that such actions in fact result from computing devices, processors, controllers, or other devices executing the firmware, software, routines, instructions, etc.

While a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The above description contains several example embodiments. It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

Accordingly, the subject matter covered by this patent is intended to embrace all such alterations, modifications, equivalents, and variations that fall within the spirit and scope of the claims that follow.

The invention claimed is:

1. An apparatus comprising:
   a pair of assemblies, each comprising a plurality of perception sensors, the assemblies mounted to an exterior of a truck, wherein each assembly is further configured such that:
   a. a first assembly is located on a left side of the exterior of the truck and a second assembly is located on a right side of the exterior of the truck;
   b. the first and second assemblies are disposed in a location that is outboard of a respective left side or right side of the exterior of the truck;
   c. at least some of the perception sensors in each assembly further comprise a forward facing sensor and a rearward facing sensor, and wherein the forward facing sensor and rearward facing sensor have at least one region of overlapping field of view along a least one side of the truck;
   d. the perception sensors are further disposed such that (i) lane markings adjacent to the truck, and (ii) lane markings adjacent nearby a companion truck are each within a field of view of at least one perception sensor; and
   e. the perception sensors are also further disposed such that any adjacent nearby vehicles, objects and/or navigational landmarks that are forward, behind or to the side of the truck are within a field of view of at least one perception sensor; and
   a control computer, configured for
   receiving information from a companion truck regarding a desired lane change; and
   sending information to the companion truck to veto the desired lane change.

2. The apparatus of claim 1 wherein the control computer is further configured for communicating information to the companion truck regarding objects detected to either side of either the truck or the companion truck.

3. The apparatus of claim 1 wherein the perception sensors are one or more of LiDAR, camera, radar, or sonar sensors.

4. The apparatus of claim 1 wherein each assembly is further disposed within or adjacent to a respective left side or right side mirror housing.

5. The apparatus of claim 1 wherein the control computer is additionally for processing outputs of one or more perception sensors to detect whether the companion truck is staying in or departing from its respective lane.

6. The apparatus of claim 1 wherein two or more perception sensors in each assembly are mounted such that one sensor is at least partially vertically aligned with another sensor.

7. The apparatus of claim 4 wherein one or more of the perception sensors are arranged to minimize occlusion by respective exterior body components of the truck.

8. The apparatus of claim 1 wherein controlling lane center offset of the truck is further coordinated with information received from the companion truck.

9. The apparatus of claim 1 wherein two or more of the perception sensors on the truck are arranged to detect objects located in blind spots from a perspective of the companion truck.

10. The apparatus of claim 1 wherein the perception sensors are further arranged within mirror assemblies in a configuration that is specific to a particular model of the truck.

11. The apparatus of claim 10 wherein cables connecting the perception sensors to the control computer are fed through a mounting arm for the mirror assemblies.

12. The apparatus of claim 1 wherein the perception sensors include a plurality of lidar sensors that are further arranged such that a union of their fields of view either, as compared to each individual sensor, either (i) reduces occlusion of areas of interest or (ii) increases usable lidar data points around both the truck and the companion truck.

13. The apparatus of claim 1 wherein data provided by one or more perception sensors detects landmarks adjacent a path of travel that are further utilized by the control computer to determine the lane center offset of the truck.

14. The apparatus of claim 1 wherein data provided by one or more perception sensors is used by the control computer to estimate and/or control a distance or a change in distance to a companion truck.

15. The apparatus of claim 14 wherein at least some of the perception sensors are cameras that are further arranged to estimate distance to the companion truck.

16. The apparatus of claim 4 wherein data from the perception sensors is used by the control computer to detect objects that are located in blind spots of the companion truck.

17. The apparatus of claim 4 wherein the perception sensor outputs on the truck are further used by the control computer to detect a landmark adjacent the companion truck.

18. The apparatus of claim 1 wherein an ideal location of lane markings adjacent the truck accommodates an offset from an ideal location of the lane markings adjacent the companion truck.

19. The apparatus of claim 1 wherein an ideal location of any one of the lane markings includes a time varying offset.

20. The apparatus of claim 1 wherein the companion truck is located forward of the truck, and wherein the control computer is further for:
   processing outputs of the sensors to detect lane markings adjacent the truck and to thereby determine a lane center offset of the truck;
   processing outputs of the sensors to detect lane markings adjacent the companion truck and to thereby determine a lane center offset of the companion truck; and
   using the determined lane center offset of the truck and the determined lane center offset of the companion truck for further controlling the lane center offset of the truck so as to mimic the lane center offset of the companion truck.

21. The apparatus of claim 1 wherein
at least some of the perception sensors are located on the left side positioned and oriented relative to at least some of the perception sensors located on the right side, so that at least some of the perception sensors on the left side have a substantially different field of view (FOV) than at least some of the perception sensors on the right side.

22. The apparatus of claim 1 additionally comprising:
a vehicle to vehicle (V2V) radio configured for sending and receiving communications between the truck and the companion truck.

* * * * *